US008804197B2

(12) United States Patent
Yan

(10) Patent No.: US 8,804,197 B2
(45) Date of Patent: Aug. 12, 2014

(54) PRINT QUALITY CONTROL METHOD

(71) Applicant: Tak kin Andrew Yan, Hong Kong (CN)

(72) Inventor: Tak kin Andrew Yan, Hong Kong (CN)

(*) Notice: Subject to any disclaimer, the term of this patent is extended or adjusted under 35 U.S.C. 154(b) by 0 days.

(21) Appl. No.: 13/902,883

(22) Filed: May 27, 2013

(65) Prior Publication Data
US 2013/0258413 A1 Oct. 3, 2013

Related U.S. Application Data

(60) Division of application No. 12/626,871, filed on Nov. 27, 2009, now Pat. No. 8,451,503, which is a continuation of application No. PCT/CN2008/001021, filed on May 26, 2008.

(51) Int. Cl.
*H04N 1/405* (2006.01)
(52) U.S. Cl.
USPC ............ 358/3.09; 358/3.2; 358/504
(58) Field of Classification Search
USPC ......... 358/1.9, 2.1, 3.06–3.09, 3.2, 3.16, 500, 358/400, 406, 504, 529
See application file for complete search history.

(56) References Cited

U.S. PATENT DOCUMENTS

| 6,916,765 | B2 * | 7/2005 | Yock ............................ 503/227 |
| 7,612,915 | B2 * | 11/2009 | Zeng et al. ................... 358/3.02 |
| 2007/0046957 | A1 * | 3/2007 | Jacobs et al. .................. 358/1.9 |
| 2008/0007784 | A1 * | 1/2008 | Tsuji ............................. 358/2.1 |

FOREIGN PATENT DOCUMENTS

JP 2001144982 A * 5/2001

* cited by examiner

*Primary Examiner* — Thomas D Lee
*Assistant Examiner* — Stephen M Brinich
(74) *Attorney, Agent, or Firm* — Matthias Scholl P.C.; Matthias Scholl

(57) ABSTRACT

A print quality control method, including the steps of: providing a visual referring target on the printing substrate; setting a specific halftone of black "K"; creating a neutral grey tone i.e. NGT; placing tightly both MGT and NGT next to each other across the printing surface; and comparing both printed tones result. By adopting the grey balance theory and visual matching technique, the resultant can provide accurate ink balance information for the production personnel to immediate execute the correction on the imbalance inking condition during production.

16 Claims, 4 Drawing Sheets

FIG. 1A
FIG. 1B
FIG. 1C
FIG. 1D
FIG. 1E
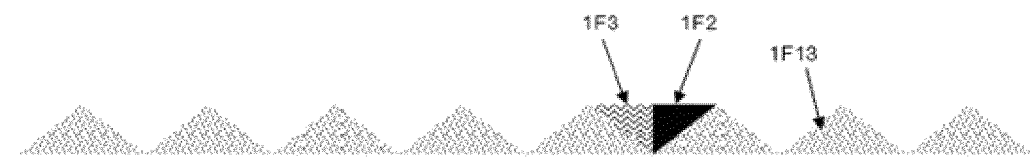
FIG. 1F
FIG. 1G
FIG. 1

FIG. 2A
FIG. 2B
FIG. 2C
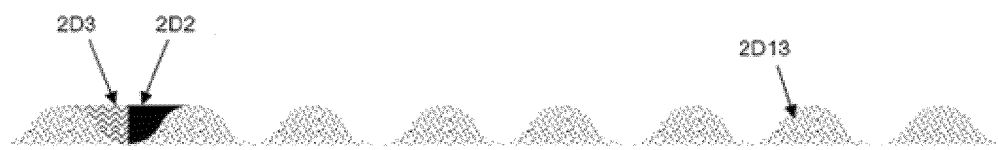
FIG. 2D
FIG. 2E
FIG. 2F
FIG. 2G
FIG. 2

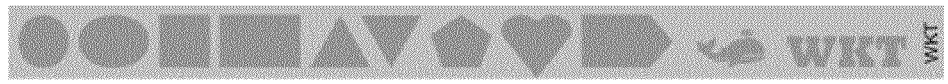
FIG. 3A
FIG. 3B
FIG. 3C
FIG. 3D
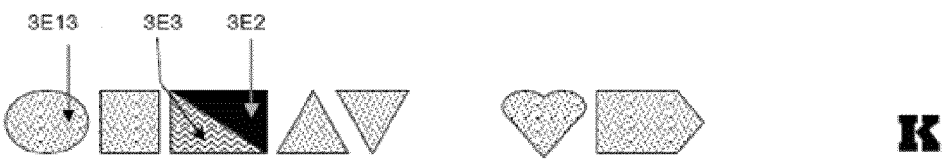
FIG. 3E
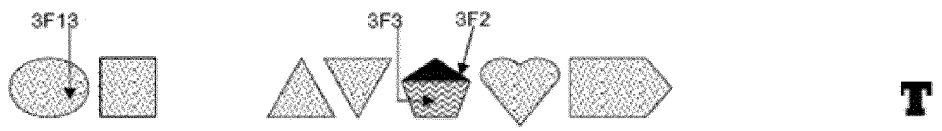
FIG. 3F
FIG. 3G
FIG. 3

FIG. 4A
FIG. 4B
FIG. 4C
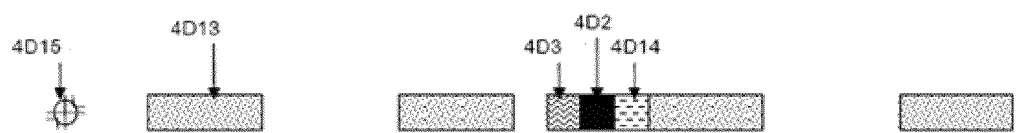
FIG. 4D
FIG. 4E
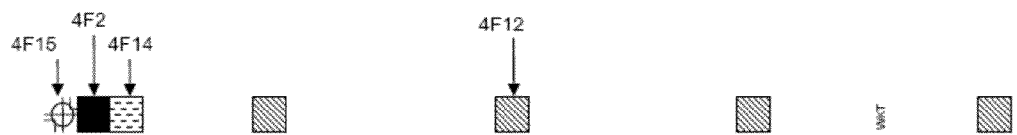
FIG. 4F
FIG. 4

PRINT QUALITY CONTROL METHOD

CROSS-REFERENCE TO RELATED APPLICATIONS

This application is a divisional of U.S. application Ser. No 12/626,871 filed on Nov. 27, 2009, now pending, which is a continuation of International Patent Application No. PCT/CN2008/001021 with an international filing date of May 26, 2008, designating the United States. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a quality control method, and more particularly to a print quality control method.

2. Description of the Related Art

CMYK color printing has been widely used for many decades. The printing industry's focal point is how to achieve precise and consistent color printing. Personal judgment by highly skilled operators is required to achieve the subjective color balance control. Unfortunately it is very difficult for the printer to monitor the changes of ink level while the machine is in high-speed production. The operator can only use the trail and error method, making adjustments until reaching the closest color balance as possible. This is a costly and time consuming process by wasting large quantity of materials and extensive set up time before the actual production can begin. Because of this, printing machine manufacturers and color management equipment producers are trying to make a suitable device to measure the print operation to achieve the best finishing result. Large numbers of high cost sophisticated equipments and complicated color management controlling rods had been introduced to the market but still relying on the operator's test skills.

This is clear that the industry needs a user friendly and cost effective color adjustment method so that the operator can easily and continuously monitor the print quality and adjust the ink level as quickly as possible to achieve the high quality and speed production without using tools such as magnifying glass nor ink density reader. Reducing set up time, wastage and cost are desired to be environmental friendly.

There are many different color quality control rods available in the market. All of them can only provide a single 100% solid ink value channel of CMYK variation across the sheet to meet the standard ink density measurement. It is the only standard to achieve the elementary printing result without any data for the best neutral grey balance quality. It can only provide one of the four CMYK color data at a particular ink track. The other three-color ink densities at the same ink track become unknown data for inking adjustment. For example, across the 102 cm printing press width, there are only seven to eight ink density data for each CMYK color that can be retrieved from the job, but the machine inking console is able to provide as many as 32 ink adjustment zones. The accuracy of inking adjustment becomes as little as 25% coverage across the printed sheets; the other 75% of adjustment is trial and error. To overcome the problem, this method can provide 100% inking data for each color in overprinting conditions at any position across the full machine width without having any guessing business.

SUMMARY OF THE INVENTION

In the existing market for color bars, the CMYK solid color reference are not over printing on top of each other as the actual printing job images. The standard ink value density adjustment can only be set for each individual primary color at single location on the bar. The printer cannot visualize the imbalance inking coverage to achieve the neutral grey tone print quality, inking balance can easily happen. For using this method, neutral grey tone method is the key element for success towards the highest quality color balance printing.

This invention is a print quality control method designed for mechanical, electronic, electro magnetic digital printing processes. It can provide a visual referring target on the printing substrate for color balance adjustment.

In view of the above-described problems, it is one objective of the invention to provide a print quality control method, comprising the steps of: providing a visual referring target on the printing substrate for color balance adjustment, setting a specific halftone of black "K" as the referring monochrome grey tone, i.e. MGT; creating a neutral grey tone i.e. NGT, by the accurately registered, cyan "C", magenta "M" and yellow "Y" color each having a pre-determined halftone value; placing tightly both MGT and NGT next to each other across the printing surface; and visual comparing both printed tones result to control color balance of the grey tones.

In a class of this embodiment, the method further comprises the steps of: comparing the specific halftone of black "K" being the referring monochrome grey tone, i.e., MGT, and the "CMY" neutral grey tone, i.e., NGT to the grey tones values; providing referring MGT and NGT targets, comparing color balance changes in the grey tones, and making the fine color correction to achieve the neutral grey balance condition; and when the result of MGT and NGT on the printed proof is balanced and visually similar in shade, the MGT and NGT are act as the referring targets for the future mass production quality control usages.

In a class of this embodiment, based on the appropriate uniquely pre-determined grey patches, which are suitable in size, forming grey images for referring to control color changes, placing the grey patches next to each other, which are inverted in position, placed across the full job's width and accurately registered in serial pattern for providing color balance correction information.

In a class of this embodiment, both grey tones are appropriate uniquely defined visual referring patches, which are placing in position next to each other; and in design of "V", "U", "R" or "Unique Pre-determined" shape, and accurately registered in serial pattern for providing correction information for color balance.

In a class of this embodiment, both grey tones are appropriate uniquely defined visual referring patches, wherein the suitable size and shape of the patches are determined based on the availability in the substrate space and MGT and NGT are integrated as the part of the job images to meet the best visual referring result.

In a class of this embodiment, both grey tones are placed next to each other in the required rectangular "R" shape and accurately registered in serial pattern; in this rectangular pattern, the accurately registered neutral grey tone, the cyan "C", magenta "M" and yellow "Y" color each having a pre-determined halftone value; and the referring monochrome grey tone being created by a specific halftone of black "K" that is placed next to the neutral grey tone "CMY" are combined as a controller group for visual color balancing correction purpose.

In a class of this embodiment, area of the referring monochrome grey tone "K" (MGT) can be replaced by 100% single color and 50% halftone in a form of CMYK grouping, which can provide more additional printing condition information to the operator.

In a class of this embodiment, a CMYK single color, halftone and SLUR indicating features are designed in between every two group members of rectangular pattern.

In a class of this embodiment, it can provide a accurately, tightly registered printing environments for creating MGT and NGT; both grey tones are used to provide the misalignment of MGT and NGT referring purpose; a white line formed between the MGT and NGT will indicate MGT and NGT are placed apart; and a dark grey line formed between the MGT and NGT will indicate an overlap in between MGT and NGT; these can provide the misalignment registered information.

In a class of this embodiment, the method can provide an uniform MGT and NGT environment conditions for the Color Density Reading Equipment manufacturers to precisely collect changes in grey tone shade value by mean of photo-electronically methods with full job width coverage; the method can provide accurate NGT overprinting value while the conventional control method can only collect imbalance density information for an CMYK individual solid color.

The conventional color control rods use individual solid CMYK referring patches and place the patches apart alternatively for data collection. This new invention can provide a uniform neutral grey tone environment condition. It can help the color density reading equipment manufacturer to precisely collect grey tone shade value changes photo-electronically with full width coverage for the best result.

This quality control method can provide a uniform MGT and NGT environment conditions for the color density reading equipment manufacturers to precisely collect grey tone shade changes value with full job width coverage by mean of photo-electronically methods. The print quality control method can provide accurately corrected NGT overprinting values compared to the conventional control rod which can only collect imbalance density information for a CMYK individual solid color.

This WKTone is a user-friendly system. A qualified press operator can easily visualize any ink value variation by comparing the NGT images with the MGT, which have been placed next to each other against the pre-printed target sample on the proof for confirmation of fine tuning towards balanced NGT mass production.

With the understanding of the market needs, this invention is designed for the printing press operator to continuously and visually monitor the three color neutral tone shade changes without using any expensive and sophisticated ink density reading equipment nor magnifying glass for saving the contaminate color identification time. Once the neutral grey shade does change, the operator can act quickly and accurately without using either viewing glass or color density reading equipment and thus spending time in evaluating color contamination and then precede time consuming adjustment.

With the understanding of the market needs, this Print Quality Control Method invention (WING "K" Tone) named WKTone is designed for the printing press operator to continuously and visually monitor the changes of the three color neutral tone shade without using any expensive and sophisticated ink density reading equipment nor magnifying glass for saving the contaminate color identification time. Once the neutral grey shade does change, the operator can act quickly and accurately without using either viewing glass or color density reading equipment thus spending time in evaluating color contamination and then precede time consuming adjustment causing delay.

This color quality control method is an easily understanding, unique computer graphic design that can be integrated in any print job at the minimum height as long as readable by the operator or by machine if necessary.

The NGT has no restriction in the size and shape as long as the difference between the MGT and NGT are distinguishable.

Both MGT and NGT images should be visually similar with each other to achieve the best printing result. The result of matching both grey tones can provide printing method having a well balanced ink distribution for proof making as well as for standardizing the consistent print quality through out the entire job. This quality control method can also provide a NGT image reference for any future order reproduction usages.

BRIEF DESCRIPTION OF THE DRAWINGS

The invention is described hereinafter with reference to accompanying drawings, in which:

FIG. 1 is a plan view of the "V" shape control method for stripping in the print job electronically or in a form of film, in which:

FIG. 1A is a plan view of the Monochrome production version;
FIG. 1B is a plan view of the Color production version;
FIG. 1C is a plan view of the CMYK overprint design;
FIG. 1D is a plan view of the Cyan design (C);
FIG. 1E is a plan view of the Magenta design (M);
FIG. 1F is a plan view of the Yellow design (Y); and
FIG. 1G is a plan view of the Black design (K);
FIG. 2 is a plan view of the "U" shape control method for stripping in the print job electronically or in a form of film, in which:

FIG. 2A is a plan view of the Monochrome production version;
FIG. 2B is a plan view of the Color production version;
FIG. 2C is a plan view of the CMYK overprint design;
FIG. 2D is a plan view of the Cyan design (C);
FIG. 2E is a plan view of the Magenta design (M);
FIG. 2F is a plan view of the Yellow design (Y); and
FIG. 2G is a plan view of the Black design (K);
FIG. 3 is a plan view of the "Unique Pre-determined design" control method for stripping in the print job electronically or in a form of film, in which:

FIG. 3A is a plan view of the Monochrome production version;
FIG. 3B is a plan view of the Color production version;
FIG. 3C is a plan view of the CMYK overprint design;
FIG. 3D is a plan view of the Cyan design (C);
FIG. 3E is a plan view of the Magenta design (M);
FIG. 3F is a plan view of the Yellow design (Y); and
FIG. 3G is a plan view of the Black design (K);
FIG. 4 is a plan view of the "R" control method for elementary user for stripping in the print job electronically or a form of film, in which:

FIG. 4A is a plan view of the Color production version;
FIG. 4B is a plan view of the CMYK overprint design;
FIG. 4C is a plan view of the Cyan design (C);
FIG. 4D is a plan view of the Magenta design (M);
FIG. 4E is a plan view of the Yellow design (Y); and
FIG. 4F is a plan view of the Black design (K).

DETAILED DESCRIPTION OF THE EMBODIMENTS

A detailed description of this invention is given below based on the detailed description of the invention.

There are four kinds of control devices available for selection. FIG. 1 and FIG. 2 are the "V"/"U" shapes CMYK halftone % Dots for experience as well as artistic users. FIG. 3 is the "Unique Pre-determined design". FIG. 4 is the Rectangular Form "R" for the elementary users.

Shown as FIG. 1 and FIG. 2, CMYK % Dots with "V"/"U" shape can be described as a series of "V" or "U" shape patterns of pre-determined CMYK % dots that are alternatively upright and inverted to each other with positioning serial for providing the grey tone visual comparison reference. The "K" grey tone is the primary checking reference as the starting point, which is positioned at the inverted area acting as the target to the "CMY" neutral grey halftone with a mixed upright pattern. This referring tool has no length limit. It can cover the full machine width without any interruption of ink distribution information in any color at any ink track. As operator's option, 100% solid and 50% mid-tone CMYK can also be integrated and replacing the "K" Grey Tone for additional information.

Shown as FIG. 3, "Unique Pre-determined design" is working under the same principle as the "V"/"U" shapes. The major difference is the three primary colors formed a neutral grey tone in pre-determined design shape and placing within the "K" grey tone area or vice versa. The printing result can be visible by the operator or measurable by any color measuring device to compare the result with the grey tone to achieve the best printing result. As operator's option, 100% solid and 50% mid-tone CMYK at suitable size and shape can also be integrated and replacing some "K" grey tone for additional information.

Shown as FIG. 4, rectangular form "R" can be described as neutral tone CMY pre-determined halftone % dots overprinted within the rectangular bar, which is placed next to the K % grey dots square patch for referring purpose as one group of checking element. Between every two checking elements are the individual CMYK solid; mid-tone and SLUR information tools so that the operator can fully understand the individual ink value condition, dot gain value and the printing press mechanical defect condition. Since the CMYK individual inking information are placed within the checking element and occupying space for more, the neutral grey tone element therefore can only provide 32 to 33 ink checking adjustment zones (in 40 inches press width) instead of full coverage as the "V" and "U" shapes. It is still five to six times more than the control ability of any available control rods in the market.

The "V", "U", and "unique pre-determined" design" are designed for experience users without information overload and with unique color balancing feature. These devices can be described by four elements, to build four individual color control rods for each style by different combinations. Then correctly over printing each other to become a final color quality referring FIG. 1A, FIG. 2A and FIG. 3A as monochrome versions.

FIG. 1, FIG. 2, and FIG. 3 have shown that the control rod's design consists with four elements. Correctly overprinted four process colors to form the control rods as FIG. 1B, FIG. 2B and FIG. 3B. The color of control rods of FIG. 1D, FIG. 2D, and FIG. 3D is the cyan "C". The color of control rods of FIG. 1E, FIG. 2E, and FIG. 3E is the magenta "M". The color of control rods of FIG. 1F, FIG. 2F, and FIG. 3F is the yellow "Y". FIG. 1G, FIG. 2G, and FIG. 3G are designed with pre-determined "K" grey tone halftone as the reference guide for the quality control purpose.

Elements 1D13, 2D13, and 3D13 are the pre-determined halftone cyan "C" shown as FIG. 1D, FIG. 2D, and FIG. 3D. Elements 1E13, 2E13, and 3E13 are the magenta "M" shown as FIG. 1E, FIG. 2E, and FIG. 3E. Elements 1F13, 2F13, and 3F13 are the yellow "Y" shown as FIG. 1F, FIG. 2F, and FIG. 3F. Elements 1G12, 2G12, and 3G12 are the pre-determined black "K" grey tone shown as FIG. 1G, FIG. 2G, and FIG. 3G. To achieve the best balance printing result, both "K" grey tone patches and the neutral grey tone are placing next to each other in similar shade without contaminated by any over dosed "C" "M" and "Y" color and then causing the neutral grey tone changes of shade.

In FIG. 1D, FIG. 2D, and FIG. 3D, 100% solid color cyan "C" is shown as 1D2, 2D2, and 3D2; Magenta "M" is shown as 1E2, 2E2, and 3E2; and Yellow "Y" is shown as 1F2, 2F2, and 3F2 patches. The mid-tone halftone elements patches cyan "C" shown as 1D3, 2D3, and 3D3, magenta "M" shown as 1E3, 2E3, and 3E3, and yellow "Y" shown as 1F3, 2F3, and 3F3 can be placed at any location in the device for replacing a few "K" 12 shown as 1G12, 2G12, and 3G12 grey tone referring position so that the printer can also use it for ink density measurement and dot gain verification as operator's discretion.

"R" is rectangular shape. It is designed for elementary users to learn and understand this unique color balance feature easier. This device can be described by six elements, by different combinations to build four individual color control rods, then correctly over printing each other to become a final color quality referring device 4A.

In FIG. 4, the control color bars shown as FIG. 4C is the cyan "C"; the control color bars shown as FIG. 4D is the magenta "M"; the control color bars shown as 4E is the yellow "Y", and the control color bars shown as 4F is the black "K". In FIG. 4C, FIG. 4D, FIG. 4E and FIG. 4F, mid tone halftones are all formed by "C", shown as 4C3, "M" 4D3, "Y" 4E3 and "K" 4F12, 100% solid, shown as 4C2, 4D2, 4E2 and 4F2, and slur information, shown as 4C14, 4D14, 4E14 and 4F14. Pre-determined halftone "C"—4C13, "M"—4D13 and "Y"—4E13 are carefully overprinted to form the Neutral Grey tone [NGT] and Pre-determined "K" 4F12 Grey Tone [MGT] as matching reference. Elements NGT and MGT are placed next to each other for grey tone matching to achieve the best color balancing printing result. Elements 4C15, 4D15, 4E15, and 4F15 are the register mark for accurate controlling overprinting.

This design can also easily provide the full information to the operator for visualize and continuously monitor the solid color density; study the dot gain value; slur condition and comparison between monochrome Grey Tone [MGT] and Neutral Grey tone [NGT].

The basic component of this method is made by an easy understanding design, consisting the Black "K" halftone that has been designed as the referring Monochrome Grey Tone [MGT] and the Cyan, Magenta and Yellow "C" "M" "Y" that are accurately over printed together to form the Neutral Grey Tone [NGT] by the wet trapping of pre-determined % halftone. They are placed next to each other so that the operator can immediately visualize any NGT shade changes against MGT for color correction referring. No study time or visual memory is necessary for color correction.

Under the standard lighting condition, the WKTone system can effectively provide the visual referring images so that the printing press operator can continuously and visually monitor the MGT and NGT's Neutral Tone shade imbalance condition. If the MGT and NGT are visually identical, this can be confirmed as correct CMYK inking value combination. If the MGT and NGT are visually dissimilar, the CMYK values used in the printing is incorrect. Quick color correction response is necessary.

Applying this method to the color proofing production, grey tone comparison method can also be used. The MGT and NGT can be adopted accordingly onto the proofing job to achieve the final matching result.

This invention can be described as a series of unique pre-determined design patterns that are alternatively upright and inverted to each other with positioning serial for providing the grey tone visual comparison reference.

This invention can be described as a series of "V" shape design patterns that are alternatively upright and inverted to each other with positioning serial for providing the grey tone visual comparison reference.

This invention can be described as a series of "U" shape design patterns also in the list that are alternatively upright and inverted to each other with positioning serial for providing the grey tone visual comparison reference.

Rectangular Form "R" can be described as neutral grey tone of CMY pre-determined halftone % dots over printed within the Rectangular bar, which is placed next to the K % grey dots square patch for referring purpose as one group of checking element.

As operator's opinion, 100% Solid and 50% Mid-tone CMYK at a suitable size and shape can replace some "K" Grey Tone area for additional information. Between every two checking elements are the individual CMYK solid; mid-tone and SLUR information tools so that the operator can fully understand the individual ink value condition; dot gain value as well as the printing press mechanical defect condition.

This invention can be applied for mechanical production process usages. Both NGT and MGT images are used for visual comparison purposes.

This invention can be applied for digital and electro magnetic environment production process usages. Both NGT and MGT images are used for visual comparison purpose.

This invention is a print quality control method. Both grey tones MGT and NGT color value structures are combined to be the work product content images. Required both grey tones MGT and NGT shape monitor images are designed based on the substrate space availability to determine if suitable in size and shape to meet the best visual referring result.

This invention is a Print Quality Control Method. Both MGT and NGT are accurately and tightly registered for visual referring purposes. A white line formed between the MGT and NGT will indicate MGT and NGT are placed apart. When a dark grey line formed between the MGT and NGT it will indicate an overlap between MGT and NGT. These can provide misalignment-registered information.

The embodiments of the present invention further comprise the following advantages and application:

1.1) Linear graphic device containing Neutral Grey Tone [NGT] information for visual comparison. Single tone reference is to simplify the color differentiation checking period and speed up the color adjustment time.

1.2) Continuous monitoring of printing press running status for imperfections; doubling; gear marking; mechanical wearing; scumming; inconsistency of ink supply method; automatic color bar scanning device malfunction and etc.

1.3) Color reference is positioned side by side, creating diffusion referring function. No visual memory is required for matching tones to achieve instant color adjustment. Conventional CMYK individual color reference patches are often remotely placed making it extremely difficult or impossible for the operator to quickly and accurately compare and adjust for color matching.

1.4) Quality control method can be widely used between proof making and bulk production.

1.5) Quality control method can be widely used for mechanical, electronic, electro magnetic digital printing processes especially good application in lithographic printing, digital printing, digital and conventional proofing and color electro magnetic photocopying.

1.6) Certain jobs may need different grey balance NGT values as the target reference. It overcomes the restrictions of the grey bar for standard CIE Lab as long as the whole job is in matching condition with "V", "U", "unique pre-determined" and "R" grey bars.

1.7) Unique pre-determined design neutral grey pattern as part of the print job content can be integrated in any place.

1.8) Pre-determined MGT for providing a standard reference guide for NGT color matching.

1.9) Visualization of the Neutral Grey sample in the control method to improve the imbalance inking coverage.

1.10) Simple design provides operator with instant overview aiding ink adjustment, avoiding information overload and visual confusion.

1.11) Print quality control method can provide a uniform NGT environment condition. It can be used for the color density reading equipment manufacturer to precisely collect grey tone shade value changes by means of a photo-electronic device reading 100% across the job width so that the automatic scanning and correction device can be utilized faster and more accurate than the conventional bar for collecting only the individual CMYK solid density data.

1.12) Quality control in printing production by using chosen NGT reference instead of match referring in 100% solid individual CMYK patches to save reading time and reduce trial and error that results in overprinting due to an imbalanced color condition.

1.13) The lacking color element (grey tone shade changes) can be easily identified without using expensive and sophisticated ink density reading equipment.

1.14) Universal application can be integrated with many color management controlling methods as a quick referring device.

1.15) NGT shade changes shows an incorrect balance of chosen ink(s) value.

1.16) MGT and NGT shade change appearing quickly between printed sheets indicates printing machine mechanical defect or material instability condition.

1.17) Source of inking adjustment is based on CMY overprinting result, which can truly visually represent the printing images color balance information. Conventional method uses the individual color standard density reading only and cannot visualize the overprint color changes. The resulting imbalance in the inking condition can happen without any indication.

The product description of embodiments of the present invention are as follow:

2.1) This method is to provide accurate CMYK ink zones/ ink keys adjustment control during printing. The neutral grey tone system design of "V", "U", "pre-determined" and "R" can provide maximum coverage of all CMYK inking information across the entire printing width without disruption of data.

2.2) The print quality control method is in soft form, available in digital download channel and can be output in analog form such as film wedges.

2.3) No restriction on ink set usage. Every ink set can provide the neutral grey tone as long as the balancing condition is under control.

The mechanical features of embodiments of the present invention are as follow:

3.1) Control system size can be as small and long as possible as long as it is readable. There is no restriction in height and width.

3.2) There is no restriction in Line per inch screening.

3.3) Can be in any type of halftone screening style such as AM/FM.

3.4) Screen angles are normal, no particular special screen angle setting for each CMYK is necessary.

3.5) The unique "Pre-determined" System has no restriction on shape and size of the NGT. Midtone and Solid area is to be placed over the MGT strip as long as the comparison is readable and measurable by equipment when necessary.

3.6) Control method can provide the accurately, tight registered printing environments for creating MGT and NGT. Both grey tones are used to provide the misalignment of MGT and NGT referring purpose. A dark line formed between the MGT and NGT will indicate an overlap in MGT and NGT patches. A white line formed between the MGT and NGT will indicate MGT and NGT are placed apart.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A print quality control method, comprising the steps of:
providing a visual referring target on a printing substrate for color balance adjustment;
setting a specific halftone of black "K" as a referring monochrome grey tone (MGT);
creating a neutral grey tone (NGT), by accurately overprinting a cyan "C", a magenta "M", and a yellow "Y" color according to a pre-determined halftone value percentage;
placing tightly both MGT and NGT next to each other across a printing surface; and
comparing both printed tones result to control the grey tones color balance;
wherein:
the referring monochrome grey tone "K", MGT is replaced by 100% single color and 50% halftone in a form of CMYK grouping, thereby providing additional printing condition information to an operator.

2. The print quality control method of claim 1, further comprising the steps of:
comparing said specific halftone of black "K" referring monochrome grey tone, (MGT), and said "CMY" neutral grey tone (NGT) to the grey tones values;
providing referring targets MGT and NGT, comparing the grey tones color balance changes, and making a fine color correction to achieve the neutral grey balance condition; and
when the result of MGT and NGT on the printed proof is balanced and visually similar in shade, the MGT and NGT act as the target referring function for the future mass production quality control usages.

3. The print quality control method of claim 1, wherein, based on the appropriate unique pre-determined grey patches, suitable in size, forming grey images for referring to control color changes, placing next to each other, inverted in position, placed across the full job's width and accurately registered in serial pattern for providing color balance correction information.

4. The print quality control method of claim 2, wherein, based on the appropriate unique pre-determined grey patches, suitable in size, forming grey images for referring to control color changes, placing next to each other, inverted in position, placed across the full job's width and accurately registered in serial pattern for providing color balance correction information.

5. The print quality control method of claim 3, wherein, both grey tones are appropriate unique defined visual referring patches, placing in position next to each other.

6. The print quality control method of claim 4, wherein, both grey tones are appropriate unique defined visual referring patches, placing in position next to each other.

7. The print quality control method of claim 3, wherein, both grey tones MGT and NGT color value structures are combined to be work product content images; and required both grey tones MGT and NGT shape monitor images are designed based on the substrate space availability to determine a suitable size and shape to meet the best visual referring result.

8. The print quality control method of claim 4, wherein, both grey tones MGT and NGT color value structures are combined to be work product content images; and required both grey tones MGT and NGT shape monitor images are designed based on the substrate space availability to determine a suitable size and shape to meet the best visual referring result.

9. The print quality control method of claim 5, wherein, both grey tones are in serial pattern placed next to each other in the required "R" shape and accurately registered in serial pattern;
in this rectangular pattern, the accurately registered neutral grey tone pre-determine the halftone value cyan "C", magenta "M" and yellow "Y" color; and
the referring monochrome grey tone is created by a specific halftone of black "K" that are placed next to the neutral grey tone "CMY" as a controller group for visual color balancing correction purpose.

10. The print quality control method of claim 6, wherein, both grey tones are in serial pattern placed next to each other in the required "R" shape and accurately registered in serial pattern;
in this rectangular pattern, the accurately registered neutral grey tone pre-determine the halftone value cyan "C", magenta "M" and yellow "Y" color; and
the referring monochrome grey tone is created by a specific halftone of black "K" that are placed next to the neutral grey tone "CMY" as a controller group for visual color balancing correction purpose.

11. The print quality control method of claim 9, wherein, a CMYK single color, halftone and SLUR indicating features are designed in between every two groups of rectangular pattern.

12. The print quality control method of claim 10, wherein, a CMYK single color, halftone and SLUR indicating features are designed in between every two groups of rectangular pattern.

13. The print quality control method of claim 5, wherein, both grey tones are used to provide the misalignment of MGT and NGT referring purpose;
a white line formed between the MGT and NGT will indicate MGT and NGT are placed apart; and
a dark grey line formed between the MGT and NGT will indicate an overlap between MGT and NGT.

14. The print quality control method of claim 6, wherein, both grey tones are used to provide the misalignment of MGT and NGT referring purpose;
a white line formed between the MGT and NGT will indicate MGT and NGT are placed apart; and
a dark grey line formed between the MGT and NGT will indicate an overlap between MGT and NGT.

15. The print quality control method of claim 5, wherein, said method can provide an uniform MGT and NGT environment conditions for the color value reading equipment manufacturers to precisely collect grey tone shade value changes by mean of photo-electronically with full job width coverage, to execute color correction adjustment in form of manually and/or automatically close loop adjustment method.

16. The print quality control method of claim 6, wherein, said method can provide an uniform MGT and NGT environment conditions for the color value reading equipment manufacturers to precisely collect grey tone shade value changes by mean of photo-electronically with full job width coverage, to execute color correction adjustment in form of manually and/or automatically close loop adjustment method.

\* \* \* \* \*